(12) United States Patent
Douglas Dudley

(10) Patent No.: US 11,258,988 B1
(45) Date of Patent: Feb. 22, 2022

(54) BODY-VIEWING CAMERA SYSTEM

(71) Applicant: Vivian J. Douglas Dudley, Montgomery, AL (US)

(72) Inventor: Vivian J. Douglas Dudley, Montgomery, AL (US)

( * ) Notice: Subject to any disclaimer, the term of this patent is extended or adjusted under 35 U.S.C. 154(b) by 163 days.

(21) Appl. No.: 16/934,095

(22) Filed: Jul. 21, 2020

(51) Int. Cl.
*H04N 7/18* (2006.01)
*H04N 5/232* (2006.01)
*H04N 5/225* (2006.01)

(52) U.S. Cl.
CPC .......... *H04N 7/181* (2013.01); *H04N 5/2256* (2013.01); *H04N 5/22525* (2018.08); *H04N 5/23216* (2013.01); *H04N 5/23293* (2013.01); *H04N 5/23299* (2018.08)

(58) Field of Classification Search
None
See application file for complete search history.

(56) References Cited

U.S. PATENT DOCUMENTS

| | | |
|---|---|---|
| 6,411,332 B1 | 6/2002 | Whitby |
| 8,951,187 B2 | 2/2015 | Anderson et al. |
| D765,756 S | 9/2016 | Liu |
| 9,736,342 B2 | 8/2017 | Mueckl |
| 9,769,359 B2 | 9/2017 | Chen |
| 9,769,539 B2 * | 9/2017 | Bhogal ................ H04N 21/812 |
| 10,063,781 B2 * | 8/2018 | Hayashi ................ H04N 7/181 |
| 10,401,902 B1 * | 9/2019 | Pawar .................. G06F 1/1605 |
| 10,408,770 B2 | 9/2019 | Glover |
| 10,958,804 B2 * | 3/2021 | Iki ....................... H04N 5/23245 |
| 2004/0211868 A1 | 10/2004 | Holmes |
| 2005/0001821 A1 * | 1/2005 | Low .................. H04M 1/72469 345/169 |
| 2008/0068460 A1 | 3/2008 | Sheridan |
| 2011/0105895 A1 * | 5/2011 | Kornblau ............... A61B 34/20 600/426 |
| 2012/0019641 A1 * | 1/2012 | Reeder, III .......... F16M 13/022 348/61 |
| 2013/0057717 A1 * | 3/2013 | Chou .................... G06F 3/0482 348/222.1 |
| 2013/0345835 A1 * | 12/2013 | Stahl .................... G06F 3/0362 700/83 |
| 2015/0067366 A1 * | 3/2015 | Lai .......................... G06F 1/163 713/320 |
| 2016/0240002 A1 * | 8/2016 | Ogata .................. G06K 9/4652 |
| 2017/0034416 A1 * | 2/2017 | Heilman ................ H04N 7/181 |
| 2017/0201672 A1 * | 7/2017 | Hayashi ................. H04N 5/04 |
| 2018/0041680 A1 | 2/2018 | Lu |

(Continued)

FOREIGN PATENT DOCUMENTS

GB    2493606    3/2013

*Primary Examiner* — Brian P Yenke

(57) ABSTRACT

The body-viewing camera system comprises an image capture unit and an image display unit. The image capture unit may be an imaging unit adapted to be held by a user and may be aimed at a body part by the user. The body-viewing camera system may present a still image or a video on the image display unit showing the body part selected by the user. A gooseneck tubing located on the image capture unit may extend the reach of the user and may retain an orientation of a camera within the image capture unit be established by the user such that the image capture unit may image a hidden body part to determine the presence and extent of one or more blemishes.

16 Claims, 5 Drawing Sheets

(56) References Cited

U.S. PATENT DOCUMENTS

| | | | | |
|---|---|---|---|---|
| 2018/0074309 A1* | 3/2018 | Torres | ............... | G02B 23/2476 |
| 2018/0176458 A1* | 6/2018 | Tsuchiya | ............... | H04N 5/225 |
| 2018/0288477 A1* | 10/2018 | Gupta | ............... | H04N 21/434 |
| 2019/0014242 A1* | 1/2019 | Piekarski | ............... | G06F 1/1686 |
| 2019/0038135 A1* | 2/2019 | Lee | ............... | A61B 3/12 |
| 2019/0342621 A1* | 11/2019 | Carrigan | ............... | H04N 7/18 |
| 2020/0327670 A1* | 10/2020 | Connor | ............... | G06T 7/62 |
| 2020/0336631 A1* | 10/2020 | Biasini | ............... | H04N 5/232 |

\* cited by examiner

BODY-VIEWING CAMERA SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of imaging systems, more specifically, a body-viewing camera system.

SUMMARY OF INVENTION

The body-viewing camera system comprises an image capture unit and an image display unit. The image capture unit may be an imaging unit adapted to be held by a user and may be aimed at a body part by the user. The body-viewing camera system may present a still image or a video on the image display unit showing the body part selected by the user. A gooseneck tubing located on the image capture unit may extend the reach of the user and may retain an orientation of a camera within the image capture unit be established by the user such that the image capture unit may image a hidden body part to determine the presence and extent of one or more blemishes.

An object of the invention is to view, or an image display unit, images of a hidden body part captured by an image capture unit.

Another object of the invention is to provide gooseneck tubing on the image capture unit to retain a bend shape for orienting a camera.

A further object of the invention is to provide a source of illumination adjacent to the camera in the head of the image capture unit.

Yet another object of the invention is to display, enlarge, reduce, store, and forward still images and videos on an image display unit.

These together with additional objects, features and advantages of the body-viewing camera system will be readily apparent to those of ordinary skill in the art upon reading the following detailed description of the presently preferred, but nonetheless illustrative, embodiments when taken in conjunction with the accompanying drawings.

In this respect, before explaining the current embodiments of the body-viewing camera system in detail, it is to be understood that the body-viewing camera system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the body-viewing camera system.

It is therefore important that the claims be regarded as including such equivalent construction insofar as they do not depart from the spirit and scope of the body-viewing camera system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
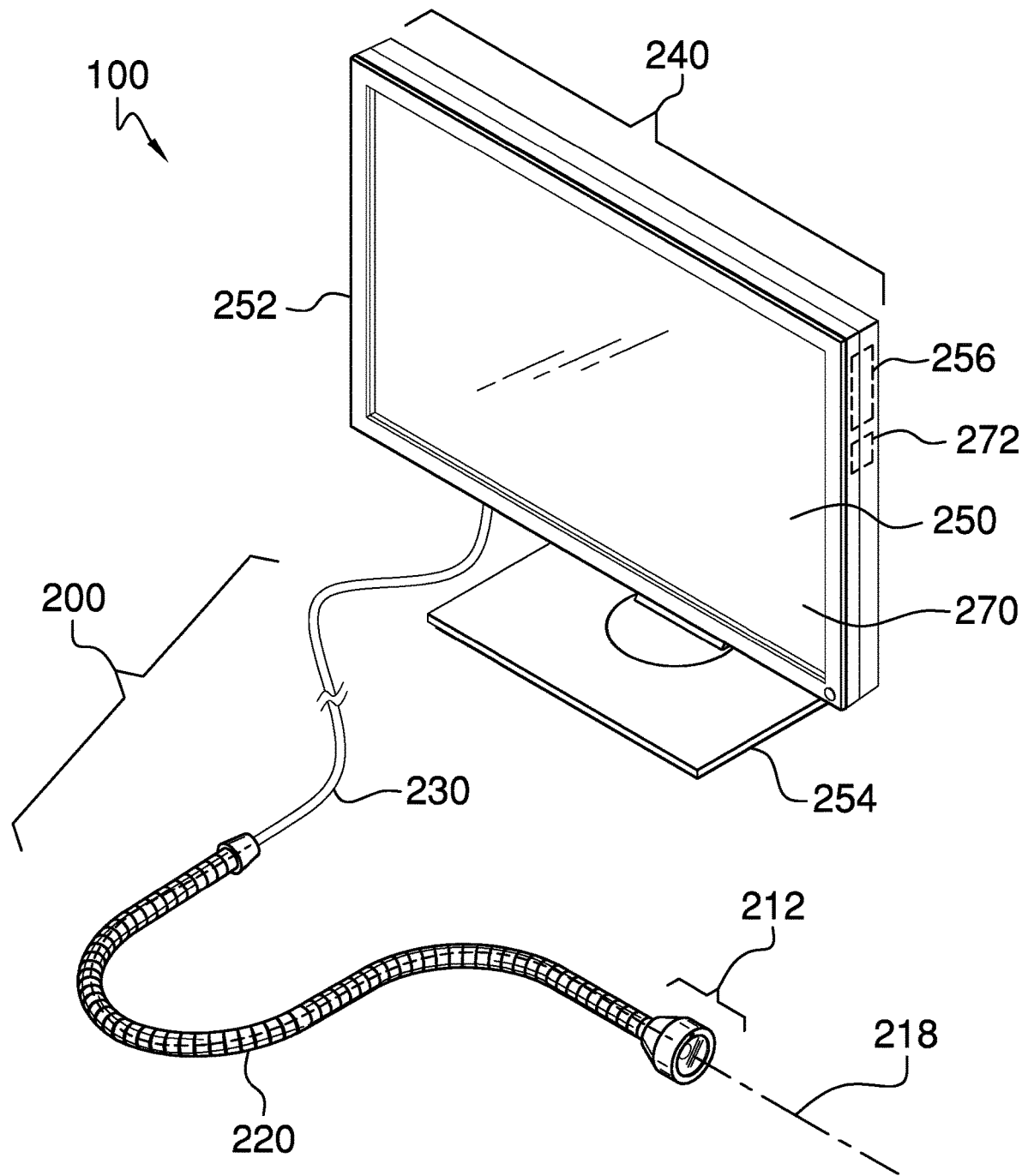
FIG. 1 is an isometric view of an embodiment of the disclosure.
Figure 2:
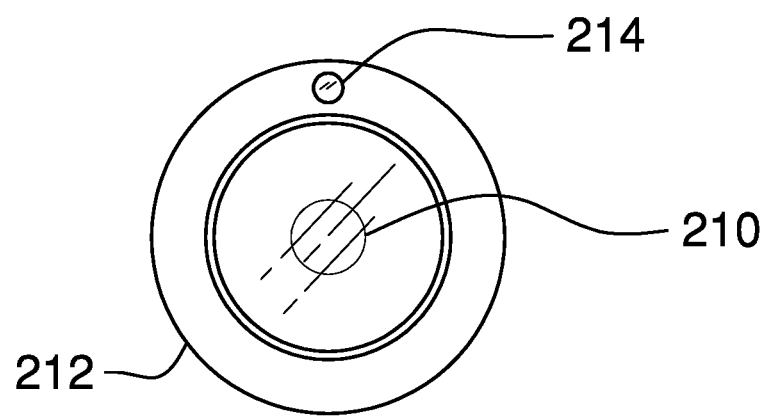
FIG. 2 is a front detail view of an embodiment of the disclosure.
Figure 3:
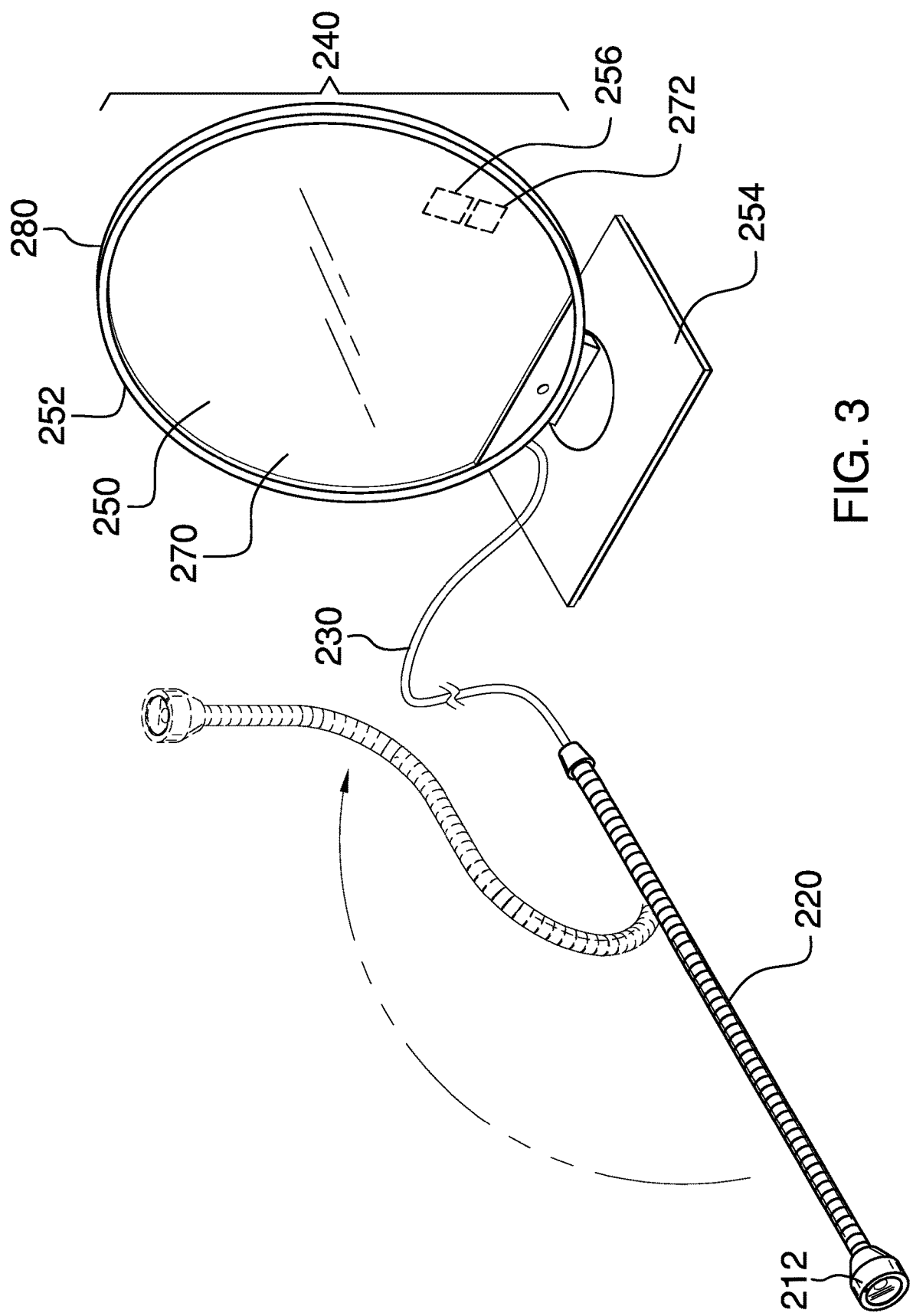
FIG. 3 is an isometric view of an alternative embodiment of the disclosure illustrating a circular display.
Figure 4:
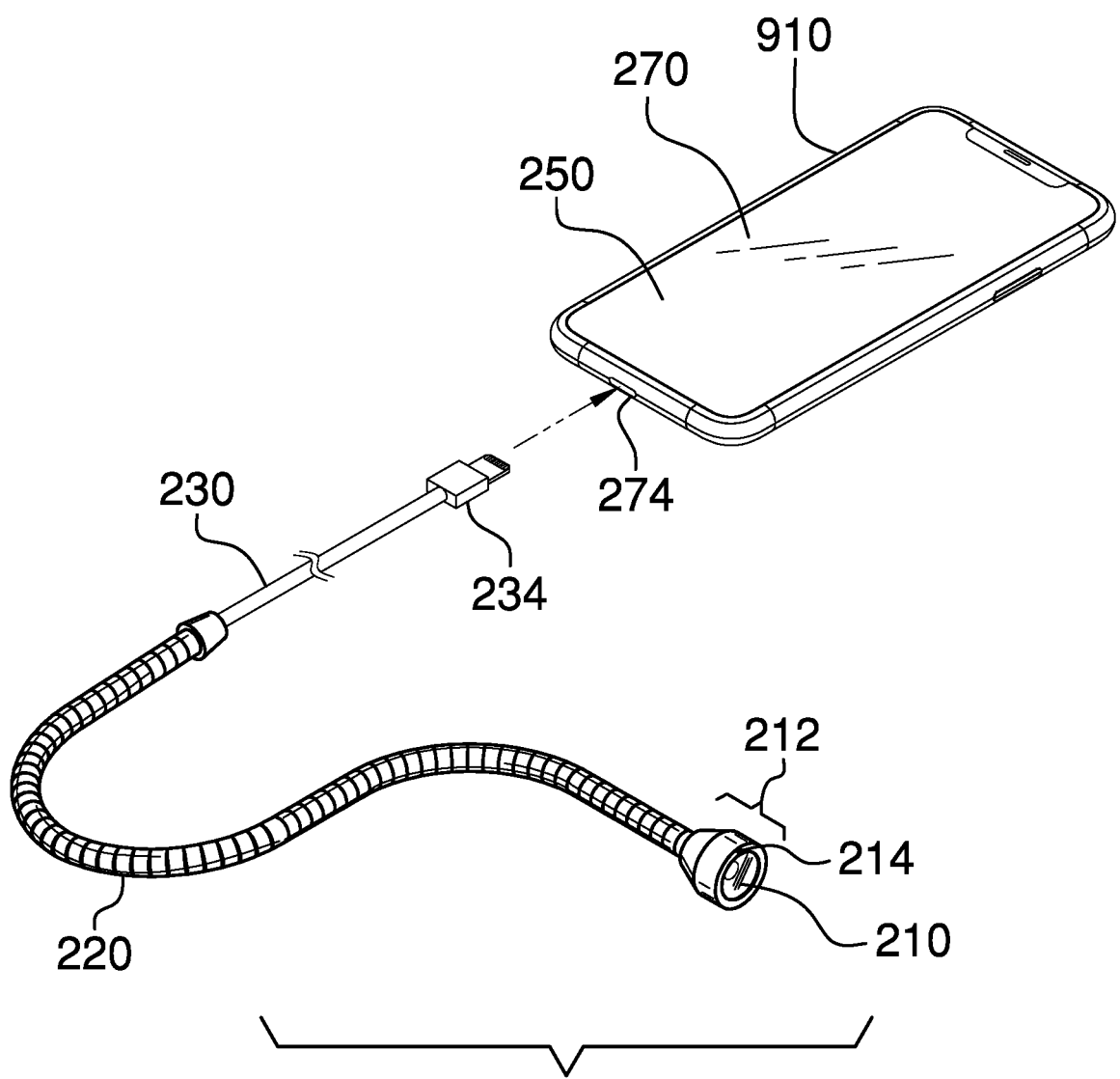
FIG. 4 is an isometric view of an alternative embodiment of the disclosure illustrating a smart device as an image display unit.
Figure 5:
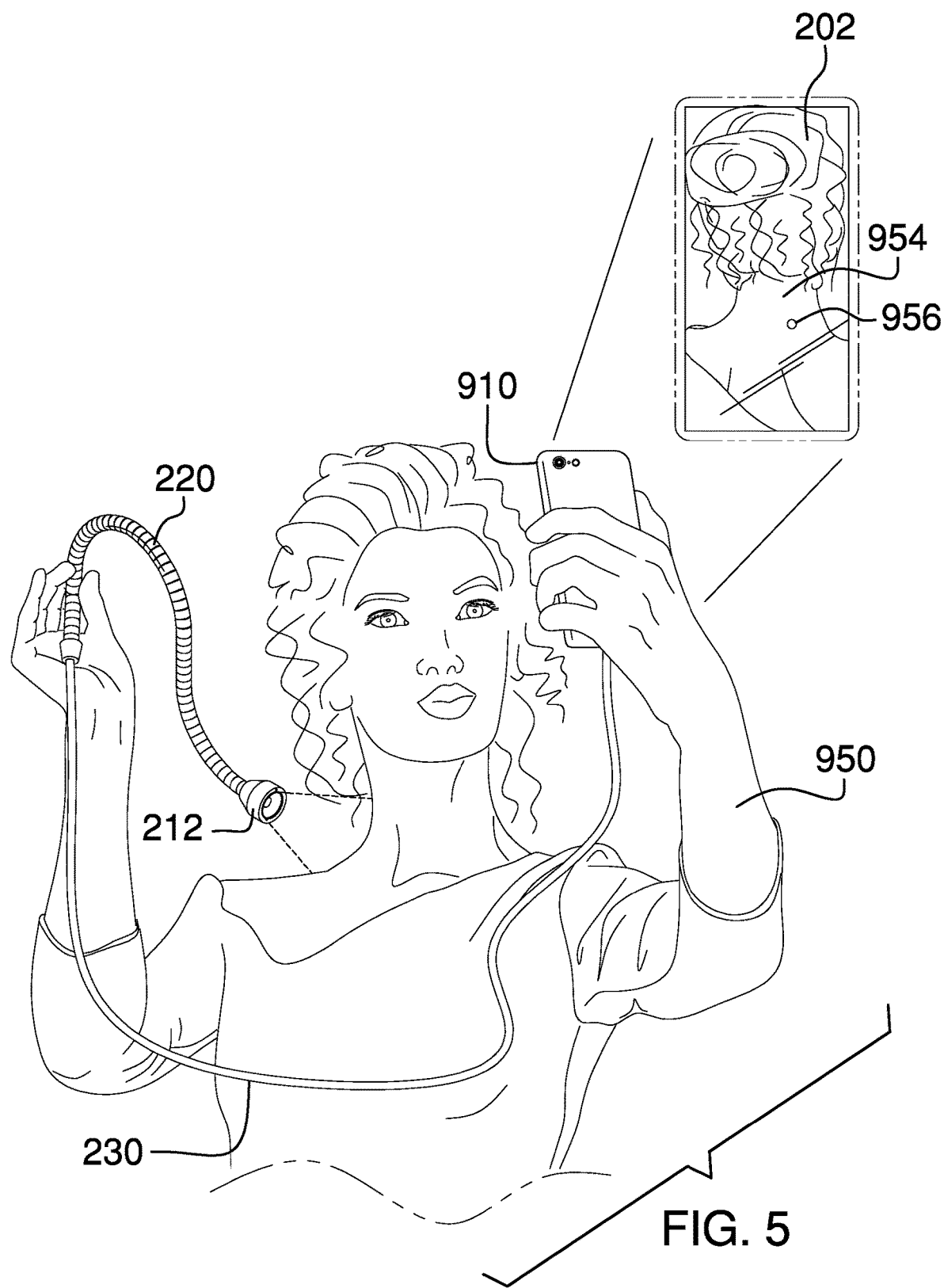
FIG. 5 is an in-use view of an embodiment of the disclosure.

Detailed reference will now be made to a first potential embodiment of the disclosure, which is illustrated in FIGS. 1 through 5.

The body-viewing camera system 100 (hereinafter invention) comprises an image capture unit 200 and an image display unit 240. The image capture unit 200 may be an imaging unit adapted to be held by a user 950 and may be aimed at a body part by the user 950. The invention 100 may be adapted to present a still image 202 or a video on the image display unit 240 showing the body part selected by the user 950. A gooseneck tubing 220 located on the image capture unit 200 may be adapted to extend the reach of the user 950 and may retain an orientation of a camera 210 within the image capture unit 200 be established by the user 950 such that the image capture unit 200 may image a hidden body part 954. As non-limiting examples, the hidden body part 954 may be the back of the head or neck, the back, the genitals, the back of the legs, the bottom of the feet, or other areas that are difficult or impossible for a person to see on their own body. As non-limiting examples, the hidden body part 954 may be examined by the user 950 to determine the presence and extent of one or more blemishes 956. As non-limiting examples, the one or more blemishes 956 may comprise warts, moles, rashes, pimples, cysts, burns, cuts, irritations, and hemorrhoids.

The image capture unit 200 may comprise the camera 210, a source of illumination 214, the gooseneck tubing 220, and a cable 230. The image capture unit 200 may pass one or mode video signals to the image display unit 240 via the cable 230. The one or mode video signals may encode a representation of a scene that is visible in front of the camera 210. The scene may be digitized and conveyed to the image display unit 240 once as the still image 202 or repeatedly as the video. The image capture unit 200 may be powered from the image display unit 240 via the cable 230.

The camera 210 may be located at the distal end of the image capture unit 200 and may capture an image of the scene that is in front of the image capture unit 200 as defined by the continuation of a longitudinal axis 218 of a head 212 of the image capture unit 200. The camera 210 may be an electro-optical instrument that captures the image by measuring the light striking a plurality of picture elements within the camera 210. The picture elements may be organized as a matrix. The camera 210 may then encode the light measurements at the picture elements as the one or mode video signals. In some embodiments, the camera 210 may utilize a charge coupled device (CCD) to capture the image. The camera 210 may couple to the cable 230 such that the one or mode video signals may be conveyed to the image display unit 240 via the cable 230.

The source of illumination 214 may illuminate the scene when the source of illumination 214 is activated. The source of illumination 214 may be located at the distal end of the image capture unit 200 adjacent to the camera 210 and may be oriented to point in the same direction as the camera 210. In some embodiments, the source of illumination 214 may comprise one or more white LEDs.

The gooseneck tubing 220 may be a bendable, hollow armature. The head 212 may be coupled to the distal end of the gooseneck tubing 220. The gooseneck tubing 220 may be operable to position the head 212 such that the camera 210 may observe the hidden body part 954. The gooseneck tubing 220 may be adapted to be held by the user 950 such that the user 950 may aim the camera 210 and the source of illumination 214 towards the one or more blemishes 956. The cable 230 may pass through the gooseneck tubing 220 from the camera 210 located in the head 212. The cable 230 may extend out of the proximal end of the gooseneck tubing 220 towards a cable connector 234. As a non-limiting example, the user 950 may bend the gooseneck tubing 220 into a J-shape with the head 212 located on the shorter leg of the J-shape and may hold the gooseneck tubing 220 at the longer end of the J-shape while aiming the head 212 towards the back of their shoulder.

The cable 230 may comprise a plurality of conductors that may electrically couple the camera 210 and the source of illumination 214 to the image display unit 240. The plurality of conductors may comprise the one or mode video signals and power connections necessary to operate the camera 210 and the source of illumination 214. The proximal end of the cable 230 may be terminated by the cable connector 234 which may be operable to interconnect the image capture unit 200 to the image display unit 240.

The image display unit 240 may control the operation of the image capture unit 200. As non-limiting examples, the image display unit 240 may activate or deactivate the source of illumination 214 and may request the transmission of the still image 202 and the video from the image capture unit 200 to the image display unit 240. The image display unit 240 may be adapted to present the still image 202 and/or the video sourced from the image capture unit 200 to the user 950. The image display unit 240 may provide electrical power to the image capture unit 200 via the cable 230. A display screen 250 may be mounted within and protected by a housing 252. The housing 252 may comprise a display stand 254 to retain the image display unit 240 in an upright orientation. The display screen 250 may provide a display unit connector 274 for coupling the image capture unit 200 to the image display unit 240. In some embodiments, the display unit connector 274 may be a USB connector or a Lightning connector. The display unit connector 274 may be used to offload the still images 202 and the videos to an external device. As a non-limiting example, the external device may be an external disk drive or a USB memory key.

In some embodiments, the image display unit 240 may comprise a controller 256. The controller 256 may control the overall operation of the image display unit 240. The controller 256 may be adapted to interact with the user 950 via a touchscreen 270 and the display screen 250. The controller 256 may activate and deactivate the source of illumination 214. The controller 256 may request the still images 202 and the videos from the image capture unit 200. The controller 256 may copy the still images 202 and the videos to the external devices couple to the image display unit 240 via the display unit connector 274.

In some embodiments, the image display unit 240 may comprise the touchscreen 270. The touchscreen 270 may be adapted to sense contact by the user 950 above the display screen 250 to the controller 256. The controller 256 may interpret contact with the touchscreen 270 within the context of the display screen 250 content. As a non-limiting example, of the controller 256 has presented a menu of options to the user 950 on the display screen 250, contact with an area of the touchscreen 270 that is above one option may be interpreted as a selection of that option. The touchscreen 270 may be used to enlarge or reduce the size of the still image 202 on the display screen 250 and to direct forwarding of the still image 202 to another device.

In some embodiments, the image display unit 240 may comprise a wireless transceiver 272. The wireless transceiver 272 may be electrically coupled to the controller 256. The wireless transceiver 272 may be operable to transfer data between the controller 256 of the image display unit 240 and one or more devices that are accessible via a computer network. As non-limiting examples, the computer data network may be WiFi, Bluetooth, or the cell phone data network. The wireless transceiver 272 may be operable, under direction of the controller 256, to forward the still images 202 and the videos as email. The wireless transceiver 272 may be operable, under direction of the controller 256, to receive updates to software resident within the image display unit 240 such that the software may be updated or upgraded.

In some embodiments, the housing 252 and the display screen 250 may be circular to match the shape of the head 212. A circular display 280 may ease the task of aiming the camera 210 since the shape of the display screen 250 may physically correlate with the shape of the head 212.

In some embodiments, the image display unit 240 may be a smart device. As non-limiting examples, the smart device may be a smartphone 910 or a laptop computer. An application program executing on the smart device may be adapted to communicate with the image capture unit 200 and may enable the user 950 to control the operation of the image capture unit 200. The application program may be operable to transfer the still images 202 and the videos from the image capture unit 200 to the smart device such that the still images 202 and the videos may be stored on the smart device or may be copied to another location over a computer network or transmitted as email attachments.

In use, an image capture unit 200 is coupled to an image display unit 240 by connecting a cable connector 234 at the proximal end of a cable 230 to a display unit connector 274 on the image display unit 240. A gooseneck tubing 220 may be bent into a shape that allows a head 212 of the image capture unit 200 to view a hidden body part 954 while the proximal end of the gooseneck tubing 220 is held by a user 950. The user 950 may activate a source of illumination 214 using a touchscreen 270 of the image display unit 240. One or more blemishes 956 may be imaged using a camera 210 located in the head 212 of the image capture unit 200 and still images 202 or videos may be viewed on the image display unit 240. The user 950 may interact with the touchscreen 270 to enlarge and reduce the images.

Alternatively, the gooseneck tubing 220 may be held by a second individual such as a doctor, nurse, or family member.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "application" or "app" may be software that is specifically designed for use with a personal computing device.

As used in this disclosure, "bendable" may refer to an object or material which will deform when a force is applied to it, which will not return to its original shape when the deforming force is removed, and which will retain the deformed shape caused by the deforming force.

As used in this disclosure, "Bluetooth" may be a standardized communication protocol that is used to wirelessly interconnect electronic devices. Bluetooth® is a registered trademark of Bluetooth SIG.

As used in this disclosure, a "camera" may be a sensor that converts light into electric signals that encode the spatial orientation of the captured light in a manner that reproduces the images seen by a human eye.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", may refer to connecting, either directly or indirectly, and does not necessarily imply a mechanical connection.

As used herein, the words "data" and "information" may be used interchangeably to refer to raw, unprocessed facts and to facts that have been processed, structured, organized, or presented in a context that makes the facts useful.

As used in this disclosure, a "disk" may be a cylindrically shaped object with parallel opposing sides. A disk generally has a thickness (as measured from flat side to flat side) that is less than the radius of the cylinder.

As used in this disclosure, a "display" may be a surface upon which is presented an image, potentially including, but not limited to, graphic images and text, that is interpretable by an individual viewing the image. When used as a verb, "display" may be defined as presenting such an image.

As used in this disclosure, the terms "distal" and "proximal" may be used to describe relative positions. Distal refers to the object, or the end of an object, that is situated away from the point of origin, point of reference, or point of attachment. Proximal refers to an object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point, a central axis, or a centerline of an object and the direction of comparison may be in a radial or lateral direction.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used herein, "gooseneck" may refer to a hose or tubing that will bend and retain the shape of the bend after the bending force is removed. Goosenecks are often used on lamps and microphone stands to allow an orientation of the lamp or microphone be set and held.

As used herein, "hidden body part" may refer to a part of the human body that is difficult or impossible for a human to view on their own body. Non-limiting examples of hidden body parts may comprise the back of the head, genitals, and the buttocks.

As used in this disclosure, an "image" may be an optical representation or reproduction of an indicia or of the appearance of something or someone.

As used in this disclosure, a "laptop computer" may be a computer that incorporates into a single housing: 1) a mechanism to provide tactile inputs; 2) a mechanism to provide visual and audio outputs; 3) a mechanism to receive digital or analog inputs from an external mechanical device; and, 4) a mechanism to provide digital or analog outputs to an external mechanical device. The single housing is sized such that the laptop computer can be transported by a single person.

As used herein, "Lightning" may refer to a proprietary connector used by Apple Inc. Apple® and Lightning® are registered trademarks of Apple Inc.

As used herein, the word "longitudinal" or "longitudinally" may refer to a lengthwise or longest direction.

As used in this disclosure, a "network" may refer to a data communication or data exchange structure where data is electronically transferred between nodes, also known as terminals, which are electrically attached to the network. In common usage, the operator of the network is often used as an adjective to describe the network. As a non-limiting example, a telecommunication network may refer to a network run by a telecommunication organization while a banking network may refer to a network operated by an organization involved in banking.

As used in this disclosure, "orientation" may refer to the positioning and/or angular alignment of a first object relative to a second object or relative to a reference position or reference direction.

As used herein, "smart device" may refer to a portable electrical device comprising at least a processor, display, input device, and network connection. The input device is generally a touch screen, keyboard, or voice recognition. The network connection is generally wireless. Non-limiting examples of smart devices may include smartphones, tablets, personal digital assistants, laptop computers, and smartwatches.

As used in this disclosure, a "touchscreen" may be an interface that allows a user to interface with a logical device by touching the image bearing surface of a display.

As used in this disclosure, a "transceiver" may be a device that is used to transmit and/or receive signals. The signals may be audible, optical, or RF in nature.

As used in this disclosure, "USB" may be an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors.

As used in this disclosure, "WiFi" may refer to the physical implementation of a collection of wireless electronic communication standards commonly referred to as IEEE 802.11x and used for wireless communication between devices.

As used in this disclosure, "wireless" may be an adjective that is used to describe a communication channel that does not require the use of physical cabling.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A body-viewing camera system comprising: an image capture unit and an image display unit; wherein the image capture unit is an imaging unit adapted to be held by a user; wherein the image capture unit is adapted to be aimed at a body part by the user; wherein the body-viewing camera system is adapted to present a still image or a video on the image display unit showing the body part selected by the user; wherein a gooseneck tubing located on the image capture unit is adapted to extend the reach of the user and retains an orientation of a camera within the image capture unit be established by the user such that the image capture unit images a hidden body parts;

wherein the source of illumination illuminates the scene when the source of illumination is activated; wherein the source of illumination is located at the distal end of the image capture unit adjacent to the camera and is oriented to point in the same direction as the camera;

wherein the image display unit comprises a controller; wherein the controller controls the overall operation of the image display unit; wherein the controller is adapted to interact with the user via a touchscreen and the display screen; wherein the controller activates and deactivates the source of illumination; wherein the controller requests the still images and the videos from the image capture unit; wherein the controller copies the still images and the videos to the external devices couple to the image display unit via the display unit connector;

wherein the image display unit comprises the touchscreen; wherein the touchscreen is adapted to sense contact by the user above the display screen to the controller; wherein the controller interpret contacts with the touchscreen within the context of the display screen content;

wherein the housing and the display screen are circular to match the shape of the head; wherein a circular display eases the task of aiming the camera since the shape of the display screen physically correlates to shape of the head.

2. The body-viewing camera system according to claim 1 wherein the camera utilizes a charge coupled device to capture the image.

3. The body-viewing camera system according to claim 1 wherein the camera couples to the cable such that the one or mode video signals are conveyed to the image display unit via the cable.

4. The body-viewing camera system according to claim 1 wherein the source of illumination comprises one or more white LEDs.

5. The body-viewing camera system according to claim 1 wherein the gooseneck tubing is a bendable, hollow armature;

wherein the head is coupled to the distal end of the gooseneck tubing;

wherein the gooseneck tubing is operable to position the head such that the camera observes the hidden body part;

wherein the gooseneck tubing is adapted to be held by the user such that the user aims the camera and the source of illumination towards one or more blemishes.

6. The body-viewing camera system according to claim 5 wherein the cable passes through the gooseneck tubing from the camera located in the head;

wherein the cable extends out of the proximal end of the gooseneck tubing towards a cable connector.

7. The body-viewing camera system according to claim 6 wherein the cable comprises a plurality of conductors that electrically couple the camera and the source of illumination to the image display unit;

wherein the plurality of conductors comprise the one or mode video signals and power connections necessary to operate the camera and the source of illumination;

wherein the proximal end of the cable is terminated by the cable connector which is operable to interconnect the image capture unit to the image display unit.

8. The body-viewing camera system according to claim 7 wherein the image display unit controls the operation of the image capture unit;

wherein the image display unit is adapted to present the still image and/or the video sourced from the image capture unit to the user;

wherein the image display unit provides electrical power to the image capture unit via the cable;

wherein a display screen is mounted within and protected by a housing;

wherein the display screen provides a display unit connector for coupling the image capture unit to the image display unit.

9. The body-viewing camera system according to claim 8 wherein the display unit connector is a USB connector or a Lightning connector.

10. The body-viewing camera system according to claim 8 wherein the display unit connector is used to offload the still images and the videos to an external device.

11. The body-viewing camera system according to claim 1 wherein the image display unit comprises a wireless transceiver;

wherein the wireless transceiver is electrically coupled to the controller;

wherein the wireless transceiver is operable to transfer data between the controller of the image display unit and one or more devices that are accessible via a computer network.

12. The body-viewing camera system according to claim 11 wherein the wireless transceiver is operable, under direction of the controller, to forward the still images and the videos as email.

13. The body-viewing camera system according to claim 11 wherein the wireless transceiver is operable, under direction of the controller, to receive updates to software resident within the image display unit such that the software is updated or upgraded.

14. The body-viewing camera system according to claim 1 wherein the image display unit is a smart device;

wherein an application program executing on the smart device is adapted to communicate with the image capture unit and enables the user to control the operation of the image capture unit;

wherein the application program is operable to transfer the still images and the videos from the image capture unit to the smart device such that the still images and the videos are stored on the smart device or are copied to another location over a computer network or transmitted as email attachments.

15. The body-viewing camera system according to claim 1 wherein the image capture unit com rises the camera, a source of illumination, the gooseneck tubing, and a cable; wherein the image capture unit passes one or mode video signals to the image display unit via the cable; wherein the one or mode video signals encode a representation of a scene that is visible in front of the camera; wherein the scene is digitized and conveyed to the image display unit once as the still image or repeatedly as the video; wherein the image capture unit is powered from the image display unit via the cable.

16. The body-viewing camera system according to claim 15 wherein the camera is located at the distal end of the image capture unit and captures an image of the scene that is in front of the image capture unit as defined by the continuation of a longitudinal axis of a head of the image capture unit; wherein the camera is an electro-optical instrument that captures the image by measuring the light striking a plurality of picture elements within the camera; wherein the camera encodes the light measurements at the picture elements as the one or mode video signals.

* * * * *